United States Patent
Sanderson et al.

(10) Patent No.: US 7,796,153 B1
(45) Date of Patent: Sep. 14, 2010

(54) EQUALIZATION SYSTEM AND METHOD FOR AN IMAGING SENSOR

(75) Inventors: Thomas A. Sanderson, Brockport, NY (US); Scott A. Bennett, Canandaigua (CA); Kristo Miettinen, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1467 days.

(21) Appl. No.: 11/177,672

(22) Filed: Jul. 8, 2005

(51) Int. Cl.
   *H04N 7/12* (2006.01)
(52) U.S. Cl. .................. 348/145; 348/117; 348/123; 348/144; 348/146; 348/147
(58) Field of Classification Search ......... 348/144–147, 348/117, 123
See application file for complete search history.

(56) References Cited

U.S. PATENT DOCUMENTS 5,644,386 A * 7/1997 Jenkins et al. ............. 356/4.01
5,716,030 A    2/1998 La Fiandra et al.
6,148,103 A * 11/2000 Nenonen .................... 382/169

\* cited by examiner

*Primary Examiner*—Andy S. Rao
*Assistant Examiner*—Geepy Pe
(74) *Attorney, Agent, or Firm*—RatnerPrestia

(57) ABSTRACT

A system and method for equalizing an imaging sensor. The system includes at least one image sensor having a plurality of detectors defining a sensor array, each detector being configured to provide an output signal representative of a sensed image. The system further includes an equalization system configured to receive the output signals from the detectors; estimate a distribution for at least one detector based on the respective output signals; compare the distribution for the at least one of the detectors to a given distribution to determine a mapping function for the at least one detector; and apply the respective mapping function of the at least one detector to the output signal of the at least one detector to provide an equalized signal for the at least one detector.

18 Claims, 4 Drawing Sheets

EQUALIZATION SYSTEM AND METHOD FOR AN IMAGING SENSOR

TECHNICAL FIELD

The present invention relates, generally, to imaging sensors and, more particularly, to a method and system for equalizing such sensors.

BACKGROUND OF THE INVENTION

Imaging sensors generally use one or more arrays of detectors, such as charge-coupled devices (CCDs), to collect multiple input signals representative of the sensed image which are then output to a storage or display device. Ideally, if a fixed (flat) input signal is presented to an imaging sensor, an identical output value will be obtained for all detectors in the sensor. This is rarely the case due to variations in detector sensitivity, electronics paths and other factors. These variations, if viewed prior to correction, result in visible streaking and banding in images. Therefore, imaging sensors need to be equalized for use during normal operations so that these effects can be removed from the images before viewing.

Equalization of an imaging sensor generally includes applying processing to the detector outputs to correct for variations in the detector responses to uniform input signals. Such equalization is a necessary part of the image formation processing.

For space-based and airborne systems, equalization is affected by making special imaging collections of large flat areas of the earth, with as little variation in the scene as possible. Corrections are calculated based on these flat scenes, and then applied to all images taken with the sensor. Specialized hardware is sometimes used which allows sunlight to directly illuminate the imaging sensor in a manner that causes uniform illumination across the whole imaging array. Images resulting from these processes can then be used to derive equalization terms needed to remove streaks and bands from images collected by the system. Often both methods must be used together to derive an equalization of acceptable quality.

Current methods require either specialized image collections be made, or specialized hardware be added to the system in order to perform equalization. This is expensive and wasteful in that specialized hardware adds cost to the system, and special imaging collections require the use of image collection time that is then not available for other applications such as collection of saleable images. Therefore, it would be useful and economical to have a method for equalizing imaging systems that requires neither specialized hardware nor specialized image collections.

SUMMARY OF THE INVENTION

The present invention relates to an imaging sensor system comprising at least one image sensor and an equalization system. The image sensor has a plurality of detectors defining a sensor array. Each detector is configured to provide an output signal representative of an element of a sensed image. The equalization system is configured to receive respective output signals from the detectors; estimate a distribution for at least one of the detectors based on the respective output signal; compare the distribution for the at least one of the detectors to a given distribution to determine a mapping function for the at least one detector; and apply the respective mapping function of the at least one detector to the output signal of the at least one detector to provide an equalized signal for the at least one detector.

The present invention further provides a method of equalizing an imaging sensor system comprising at least one image sensor having a plurality of detectors defining a sensor array with each detector configured to provide an output signal representative of an element of a sensed image. The method comprises the steps of: providing an equalization system configured to receive respective output signals from the detectors; estimating a distribution for at least one of the detectors based on the respective output signal; comparing the distribution for the at least one of the detectors to a given distribution to determine a mapping function for the at least one detector; and applying the respective mapping function of the at least one detector to the output signal of the at least one detector to provide an equalized signal for the at least one detector.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

The present invention provides a system and method of equalizing an imaging sensor. The system and method of the invention overcome the shortcomings of the prior art methods in that no specialized hardware is required to perform equalization, and no specialized image collections are needed to create an equalization. Additional benefit is derived from the system and method of the present invention in that it is 'self repairing', insofar as it is capable of detecting changes in sensor response and updating the equalization without human intervention.

Figure 1:
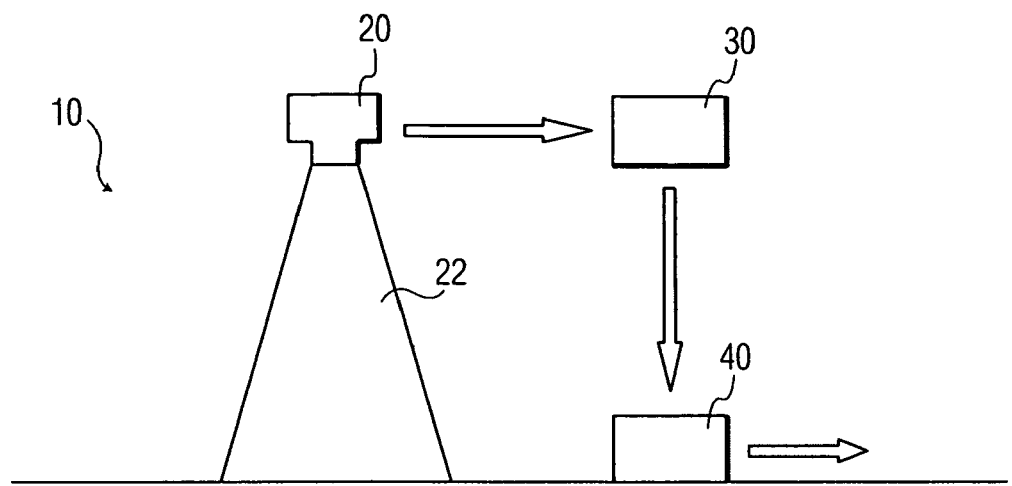
FIG. 1 is a schematic diagram of an exemplary equalizing imaging sensor system, according to the present invention.

Referring now to the drawings, in which like reference numbers refer to like elements throughout the various figures that comprise the drawings, FIG. 1 is a schematic diagram of an imaging sensor system 10 according to one embodiment of the present invention. Imaging sensor system 10 generally includes airborne/space-based image sensor 20, equalization system 30 and ground station 40. Imaging sensor 20 has a field-of-view 22 for capturing an image. The image is transferred from sensor 20 system to ground station 40 from which the image can be stored, viewed, or otherwise used by an end user. While the invention is described with respect to an airborne/space based image sensor, the invention is not limited to such and may include image sensors of various sizes and configurations, including stationary and mobile ground based sensors and handheld image sensors.

Figure 2:
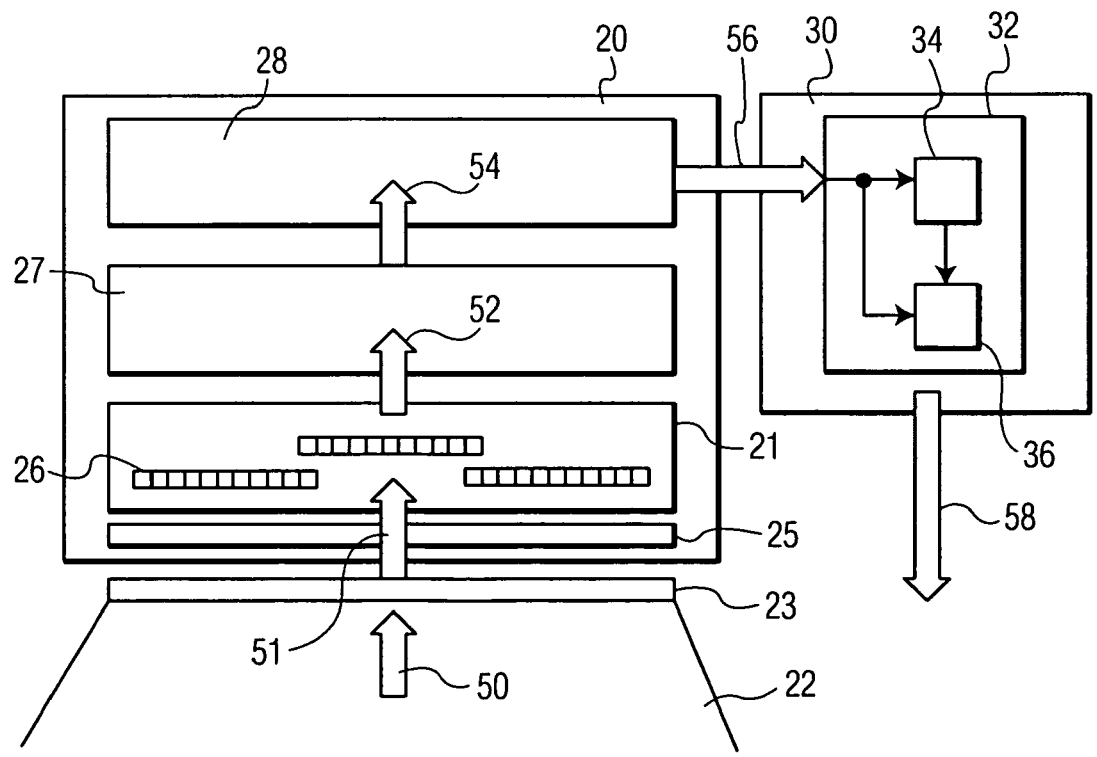
FIG. 2 is a schematic diagram of the imaging sensor and equalization system of FIG. 1.

As shown in more detail in FIG. 2, light 50 from objects in the desired field of view 22 of imaging sensor 20 arrive at optics 23, which directs or concentrates light 51 onto band filter 25 of detector chip array 21. Those skilled in the art will recognize that optics 23 may be selected according to a desired application of the imaging system and may be, for example, a converging lens, a collimator, or the like. Optics 23 may be omitted from the system altogether, without departing from the spirit of the present invention.

Band filter 25 filters the light so that a predetermined spectrum of light 51 is passed onto detector array 21, which may be a charge-coupled device, for example. Those skilled in the art will recognize that band filter 25 may be selected according to a desired application of the imaging system (i.e., depending on the frequency range of light that is to be observed) without departing from the spirit of the present invention. The frequency of the selected light may or may not fall within the range seen by the human eye. For example, either infra red or ultra violet light may be selected for the band pass as is most useful for the desired application.

Detector array 21 includes a plurality of detectors 26, which will be described in more detail hereinafter, which receive light 51 from band filter 25. Depending on the application, there may be a plurality of imaging sensors and/or band filters on a given substrate of a detector chip assembly. Electrons 52 (i.e., current) generated in the pixels of detectors 26 are directed to electrometer 27 and converted to analog voltage signal 54.

Analog voltage signal 54 is then directed to analog processing unit 28, which includes an analog-to-digital (A/D) converter for converting signal 54 into digital output signals 56. Digital output signals 56 may represent the irradiance at any given pixel of the image captured from light 50. Digital output signals 56 may be stored in memory and, subsequently, directed to equalization system 30 for equalization of the collected image data. Equalization system 30 includes processor 32 that receives output signals 56. The processor 32 includes mapping utility 34 and processing utility 36. The mapping utility 34 receives output signals 56 and generates histograms of the received output signals, as will be described in more detail hereinafter. The mapping utility 34 utilizes the histograms to generate an $f_{mapping}$ function for each detector 26. The $f_{mapping}$ functions are provided to processing utility 36, which then applies the $f_{mapping}$ functions to output signals 56, as will be described in greater detail hereinafter. The equalized image data is then assembled into final image 58 which is sent to ground station 40 or some other intended device.

While equalization system 30 is illustrated as an object in space, such is for illustration purposes only. Equalization system 30 is typically provided within imaging sensor 20, within ground station 40, or partially within imaging sensor 20 and partially within ground station 40. Alternatively, equalization system 30 may be provided in a remote location, for example, in a satellite (not shown) configured to receive signals from imaging sensor 20 and send such signals to ground station 40.

Figure 3:
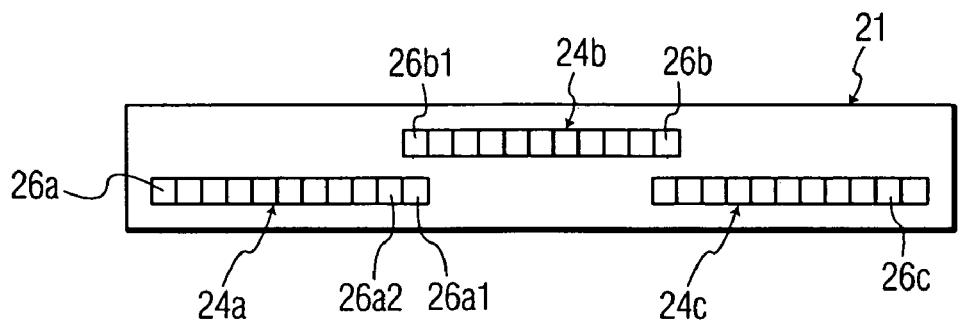
FIG. 3 is a top plan view of an illustrative panchromatic imaging sensor used with the present invention.

Referring to FIG. 3, an illustrative sensor array 21 is shown. Sensor array 21 includes a plurality of detectors 26a, 26b, 26c. In the illustrated embodiment, detectors 26a, 26b, 26c are provided on three chips 24a, 24b, 24c, respectively. Detector array 21 may include any number of chips 24a-c, with each chip 24a, 24b, 24c having any desired number of detectors 26a, 26b, 26c. Furthermore, while detector array 21 is a panchromatic array with each chip 24a-c having a single row of detectors 26a-c, the invention is not limited to such.

Figure 4:
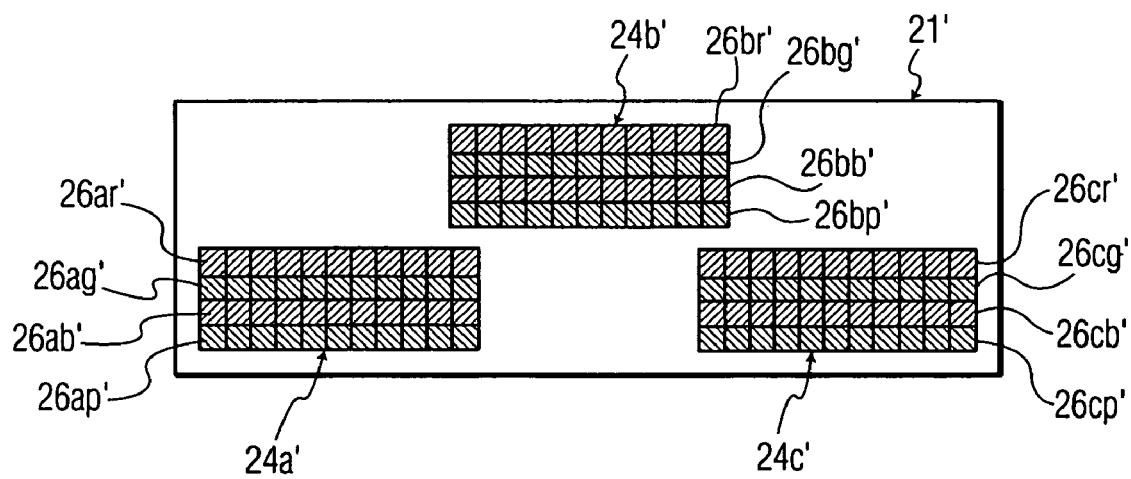
FIG. 4 is a top plan view of an illustrative multi-spectral sensor used with the present invention.

FIG. 4 shows an illustrative multi-spectral sensor array 21' useable with the present imaging sensor system 10. Each chip 24a', 24b', 24c' includes multiple rows of detectors. For example, chip 24a' includes a row of detectors 26ap' that provide a pan imaging array, a row of detectors 26ab' that provide a blue imaging array; a row of detectors 26ag' that provide a green imaging array; and a row of detectors 26ar' that provide a red imaging array. Chips 24b' and 24c' have similar rows of detectors (26bp', 26bb', 26bg', 26br'; 26cp', 26cb', 26cg', 26cr').

Sensor arrays 21, 21' of FIGS. 3 and 4 are generally known. The present imaging sensor system 10 is not limited to these sensor arrays, but instead can generally be utilized with imaging sensors having various sensor array configurations with various numbers of detectors in various chip arrangements. Furthermore, while the detectors are generally described herein as CCDs, the invention is not limited to such. Additionally, the sequencing and manner of producing the image at the detector can be varied. For example, in the following discussion, a push broom type sensor is assumed, but this is not a requirement.

Sensor 20 including array 21 is preferably configured so that it is stable with time. That is, changes in sensor behavior occur, if at all, over a relatively long period of time, namely weeks or months, not hours. Therefore, the distribution of possible outputs from sensor 20 to equalization system 30 is stable over time.

Equalization system 30 receives a number of digital output signals from detectors 26a-c. The distribution of sensor array 21 and each detector 26a-c is estimated using a histogram of the output signals summed over many image collections. The images do not need to be similar, flat images, as with the prior art systems. Instead, images with random scene content may be utilized, which generally provide better results. For example, the content of image A does not have to correlate with the content of image B.

The histogram is a bar chart of a count of pixels of every output signal that occurs in the image. Every pixel in the image corresponds to an output signal within a given range or intensity, for example, between 0 and 1,024 for a 10 bit system. While a range of 0 to 1024 is used here for illustration, the range of output signals may be larger or smaller, for example, the system may be a 16 bit system with a range of values between 0 and 65,536.

Figure 5:
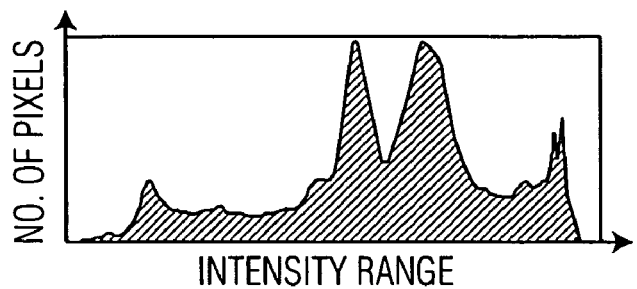
FIGS. 5-7 are illustrative histograms for three exemplary detectors.
Figure 6:
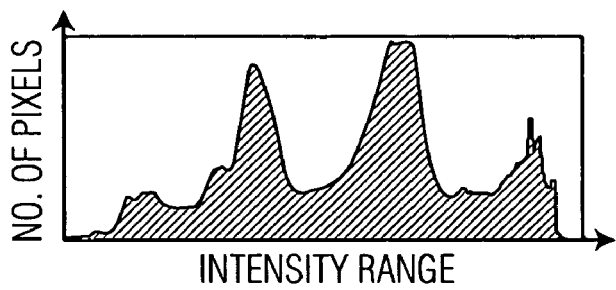
Figure 7:
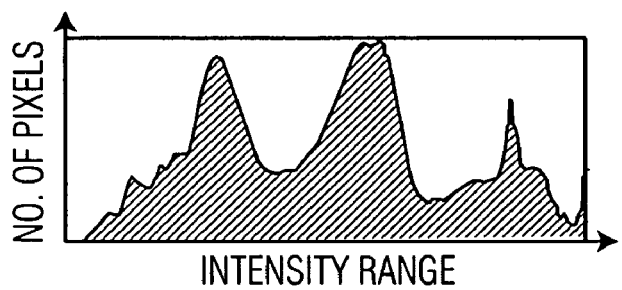

Illustrative histograms for three exemplary detectors are shown in FIGS. 5-7. The horizontal axis in each figure represents the range of output signals from 0 to 1,024, where 0 is the blackest black at the left end of the x-axis, and 1,024 is the whitest white at the right end of the x-axis. The height of each vertical bar in the histogram shows how many pixels of the respective detector, during a given time period of image scans, have had an output signal value of 0, and how many pixels have had an output signal value 1, 2, 3, etc, all the way to 1,024 at the right end of the x-axis.

Equalization system 30 collects the output signals from sensor array 21 for each detector 26a-c. The collected output signals are used to generate a histogram for each detector 26a-c for each image scan. For a given detector, equalization system 30 stores a histogram for each image, i.e. a first histogram for t=t1, a second histogram for t=t2, etc., and also generates a continuously updated, cumulative histogram including output signals from many images. Given a large enough sample of the output signals, the cumulative histogram of each individual detector 26a-c may be utilized to accurately estimate the distribution of each detector 26a-c. This distribution is referred to as $d_{detector}$.

Figure 8:
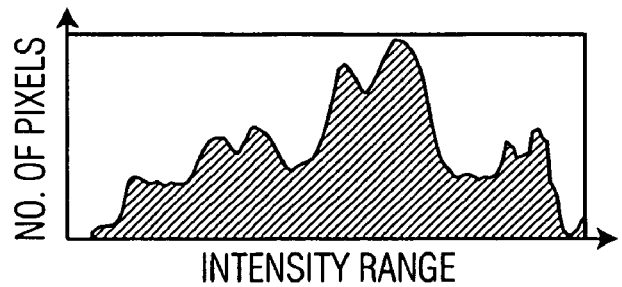
FIG. 8 is an illustrative global histogram for all of the detectors.

Furthermore, equalization system 30 also generates a histogram for the entire sensor array 21 that includes the output signals from all detectors 26. The sensor array histogram may be stored for individual images and for many images. The cumulative histogram of many images from all of detectors 26 in sensor array 21 is referred to as a global histogram. Given a large enough sample of output signals from detectors 26 of sensor array 21, the distribution of sensor 20 as a whole may be accurately estimated by the global histogram. This distribution is referred to as $d_{array}$. An illustrative global histogram is shown in FIG. 8.

In addition to generating a global histogram for sensor array 21, equalization system 30 may also generate a histogram, for individual images and multiple images, for each chip 24a-c by collecting the data for each detector 26a on chip 24a. The histogram for each chip 24a-c may provide an accurate estimation for the distribution of the respective chip, which is referred to as $d_{chip}$.

Equalization system 30 utilizes the estimated distributions to determine a mapping function for each detector 26a-c. The mapping function for a given detector is found using the formula:

$$d_{detector} * f_{mapping} = d_{array}$$

The inventors discovered that for any two spatially adjacent detectors 26a1 and 26a2 on a common chip 24a, the following relationship exists:

$$d_{detector26a1} * f_{mapping26a1} = d_{detector26a2} * f_{mapping26a2}.$$

Furthermore, for any two spatially redundant detectors 26a1 and 26b1 on adjacent chips 24a and 24b, the following relationship exists:

$$d_{detector26a1} * f_{mapping26a1} = d_{detector26b1} * f_{mapping26b1}.$$

With a sensor array stable over time and with the collection of a large sample of output signals from sensor array 21, equalization system 30 may effectively compute the $f_{mapping}$ function for each detector 26a-c of sensor array 21. Once the $f_{mapping}$ function is determined for each detector 26a-c, equalization system 30 may apply the $f_{mapping}$ function to each detector output signal to equalize each detector 26a-c of sensor array 21. Application of the $f_{mapping}$ function involves changing a given output signal to an equalized value. For example, a detector pixel may have an output signal of 255 for t=t1, while the $f_{mapping}$ function indicates that the equalized value should be 350. Equalization system 30 applies the $f_{mapping}$ function to change the output signal of that detector pixel at t=t1 to 350.

Since equalization system 30 utilizes many images when collecting samples, and does not require a flat image, the images may be continuously monitored and the $f_{mapping}$ function may be updated based on the continuous images received by imaging sensor 20. The monitoring and updating may be continuous and automatic without any human intervention. Additionally, since all of the output signals are stored in relation to a given time, equalization system 30 may apply updated $f_{mapping}$ functions to earlier output signals.

Figure 9:
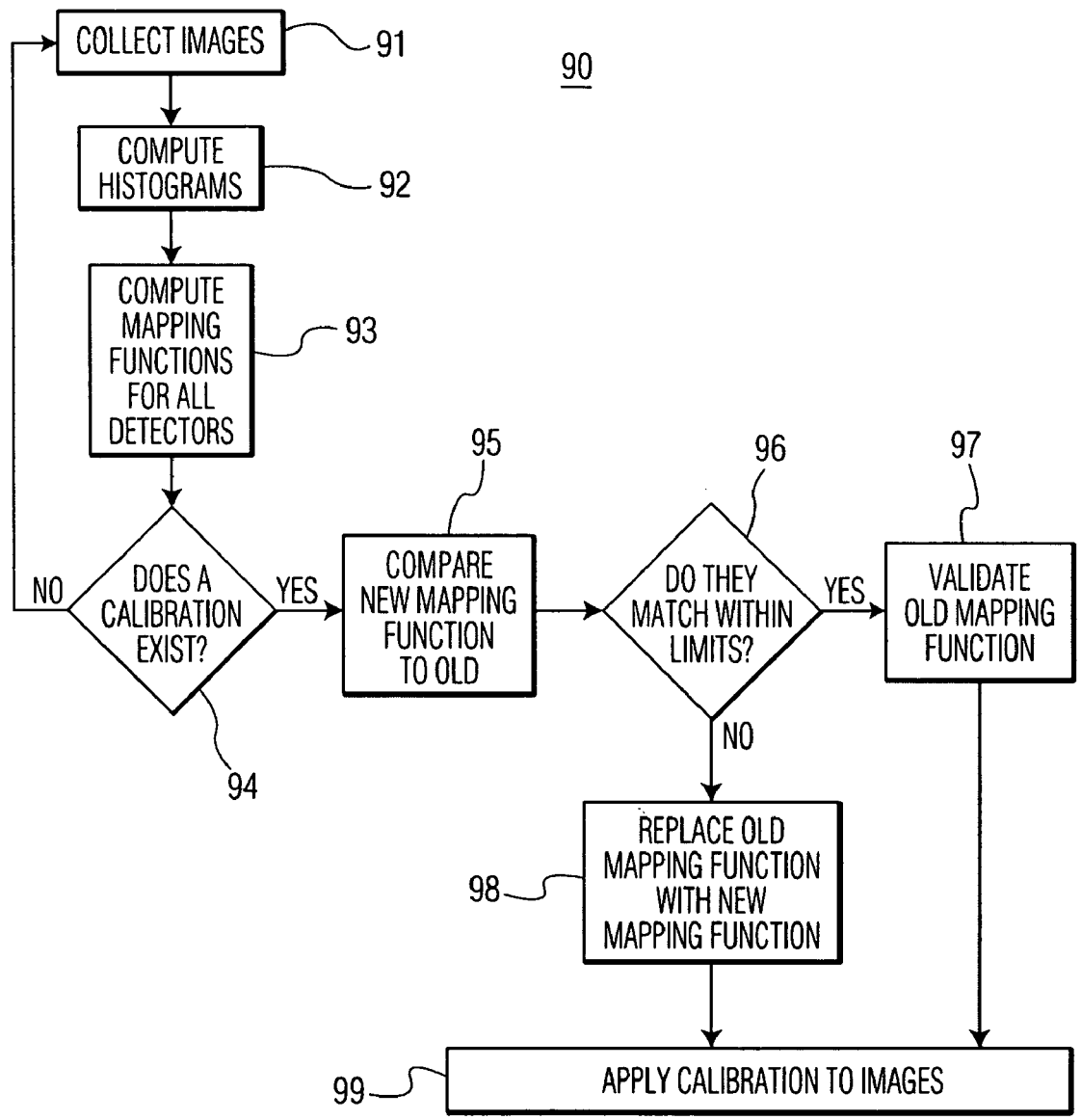
FIG. 9 is a flow diagram illustrating an exemplary method of equalizing an imaging sensor system, according to the present invention.

A flow chart showing the operation of image sensor system 10 is provided in FIG. 9, generally designated as method 90. Imaging sensor 20 collects images in step 91 using detectors 26a-c. Each detector 26a-c outputs a signal representative of the sensed image. Equalization system 30 collects the output signals and generates a histogram in step 92 for each image for each detector 26a-c. Step 92 may also generate and continuously update a cumulative histogram for each detector 26a-c. The cumulative histograms provide the estimated distribution $d_{detector}$ for each detector 26a-c. The histogram data for the individual detectors 26a-c is combined to generate a global histogram that is used to estimate the distribution $d_{array}$ for sensor array 21.

After the detector distributions $d_{detector}$ and the array distribution $d_{array}$ are determined, method 90 enters step 93, where the $f_{mapping}$ function is computed for each detector 26a-c, if there is a sufficient sample of output signals. If there is not a sufficient sample of output signals, then the histograms may not be accurate estimates of the distribution for each detector 26a-c or the distribution for sensor array 21, and therefore, an accurate calibration or equalization may not exist. Such a situation may occur during startup of imaging system 10, because imaging system 10 is typically started without any stored images and without any calibration. After startup, imaging system 10 generates initial image scans that produce output signals which are received by equalization system 30 and used to generate histograms, as described above. The number of image scans necessary to generate histograms that accurately estimate the distribution $d_{detector}$ for each detector 26a-c and the distribution $d_{array}$ for sensor array 21 depends on several factors, for example, on the resolution of imaging sensor 20 and the desired accuracy of the system. For a high resolution imaging sensor 20, only a few images may be necessary to provide an accurate estimate of the distributions. As such, imaging system 10 continues to collect images and update the histograms.

These images ultimately are operationally useable images, unlike the "calibration only" images used in prior art systems. Since the output signals for the initial images are stored, imaging system 10 may retrieve the stored initial images and retroactively equalize the initial images after the $f_{mapping}$ functions are determined.

After step 94 determines that a calibration does exist, the method enters step 95. Using step 95, equalization system 30 compares the new $f_{mapping}$ function to the old $f_{mapping}$ function to determine if the two functions match within a predetermined limit. If they do match within the predetermined limit, as determined by step 96, the old $f_{mapping}$ function is validated in step 97 and applied to calibrate the images in step 99. If the new and old $f_{mapping}$ functions do not match within the limit, step 98 is entered to replace the old $f_{mapping}$ function with the new $f_{mapping}$ function. Step 99 then applies the new $f_{mapping}$ function to the output signals for calibration. Method 90 illustrates the continuous monitoring and updating performed by equalization system 30.

An exemplary process of solving for $f_{mapping}$ function will now be described.

As an example, approximately 250 images may be initially obtained by imaging sensor 20. The detectors 26a-c provide output signals representative of the sensed images to equalization system 30. Equalization system 30 collects the output signals from detectors 26a-c and generates a histogram for each detector 26a-c and a global histogram for sensor array 21. Equalization system 30 may also generate a histogram for each chip 24a-c in sensor array 21, if it is desired to calculate the $f_{mapping}$ function for every chip. In the following description, it is assumed that each chip 24a-c holds N detectors.

The histograms provide the distribution $d_{array}$ for sensor array 21, the distribution $d_{chip}$ for each chip, and the distribution $d_{detector}$ for each detector. In this example, over 500,000 output signals may be used to determine the distribution $d_{detector}$ for each individual detector.

First, the variation in the distribution $d_{detector}$ between any two detectors on the same chip is assumed to be small compared to the variation in the distribution $d_{chip}$ of any two chips with respect to the distribution $d_{array}$ of the sensor array. Therefore, the $f_{mapping}$ function may be solved on a per chip basis. Though this is a reasonable first order approximation for the system, updating the process to solve for the $f_{mapping}$ function on a per detector basis improves results.

Second, the exposure controls of the system are assumed to be set such that a majority of data samples fall within a linear portion of the detector response. Therefore, a single linear regression may be used to solve the $f_{mapping}$ function. For many chips, this may not be sufficient and it may be necessary to solve for the $f_{mapping}$ function in a piece-wise linear fashion, or some other manner that accounts for the non-linearity of the $f_{mapping}$ function.

As identified by the inventors, if $d_{detector}$ is related to $d_{array}$ by a polynomial, or piece-wise linear relationship, then the $f_{mapping}$ function may be solved by linear regression methods, after adequate data is obtained. More complex methods may be required in systems for which the polynomial, or piece-wise linear relationship is not valid.

It should be noted that no assumption has been made that the $d_{detector}$ or $d_{array}$ distributions are normal. The method utilized by equalization system 30 is completely general with respect to distributions. Once a large enough data set is obtained and the distribution for each detector is estimated, any arbitrary distribution may be substituted for $d_{array}$ into the equation $d_{detector}*f_{mapping}=d_{array}$ so long as a $f_{mapping}$ function exists which satisfies the equation.

The $f_{mapping}$ function may be a quartic calibration curve for each detector, i.e., 5 fitted parameters per detector. In solving for the $f_{mapping}$ functions, there are two general kinds of equations, namely, equations across time and equations across distributions. Equations across time are used when there is reason to believe that two detectors (one possibly a synthetic detector, as will be described hereinafter) observe the same intensities at the same time, all the time. Equations across distributions are used, when there is reason to believe that two detectors (one possibly a synthetic detector) observe the same general intensities, but sample those intensities at different pixel indices.

The two kinds of equations may be used together for any particular detector pair, but such is not necessary. If two detectors always see the same things, at the same time, then the detectors necessarily see the same distributions over time. As such, using equations across distributions is redundant when equations across time may be used. Since equations across time are typically more accurate, the equations across time may be used and there is no need for using equations across distributions.

A method to ensure that two detectors see the same intensities at the same time, all the time, is side-slither imagery. Side-slither imagery is a process in which imaging sensor 20 is rotated 90° such that the linear arrays of detectors are parallel to the direction of travel of imaging sensor 20. In this position, the detectors sequentially observe the same image. This allows use of the equations across time. Since rotation of imaging system 20 is difficult and time consuming, particularly for satellite applications, side-slither imagery is generally only used for occasional equalization, for example, one equalization every six months.

The equations across time and across distributions provide two different sets of equations. For example, consider two detectors, α and β, and their data x ordered either by time t or by sorted order s. Both t and s range from 1 to N, where N is the number of samples taken from each detector. Data ordered by time provides a different histogram as a function of time. Sorted order s provides intensity values along the x-axis (FIGS. 5-8) rearranged into increasing order, so that $i \leq j \Rightarrow xs[i] \leq xs[j]$. Data ordered in sorted order s is a cumulative histogram with data sorted by increasing output signals across the horizontal x-axis, for example, from 0 to 1,024, as described before. The equations across time and across distribution for α and β are as follows:

$$\text{time} \rightarrow \forall i: f_\alpha(x_\alpha t[i]) = f_\beta(x_\beta t[i])$$

$$\text{space} \rightarrow \forall j: f_\alpha(x_\alpha s[j]) = f_\beta(x_\beta s[j])$$

These equations generally do not hold, but their sums of squared differences become the minimads of the optimization of the $f_{mapping}$ functions.

These equations may be set up for spatially adjacent detectors on the same chip, for spatially redundant detectors on adjacent chips, and for each detector paired against a synthetic detector ν. Synthetic detector ν is an algebraic convenience intended to express constraints placed upon parameters of the $f_{mapping}$ functions in order to exhibit an "average" total-array distribution.

Synthetic detector ν is defined differently for equations across time and for equations across distributions. Equations across time with synthetic detector ν are only used with side-slither imagery, where the assumption of observing the same scene at the same time is reasonable across the entire array. Then $x_\nu t[i]$ is defined as a robust estimate of the mode of the distribution of xt[i] across the array. It is preferable to use Cauchy weighting for the robust estimate, but a median across the array also works. Other methods may also be utilized.

For equations across distributions using synthetic detector ν, the value of $x_\nu s[j]$ is defined as an average across M consecutive samples of the total cumulative sorted ordering of all samples $x_{cum}s[k]$. The index k ranges from 1 to M·N, and N is the number of detectors. Therefore, the following relationship exists:

$$x_\nu s[j] \equiv \frac{1}{M} \cdot \sum_{k=j \cdot M-M+1}^{j \cdot M} x_{cum}s[k]$$

When using the synthetic detector ν, the following assumptions may be made:

Given side-slither type imagery collected for equalization purposes, for every detector α, $$d_{detector\alpha}*f_{mapping\alpha} = d_{detector\_\nu}*f_{mapping\_\nu}.$$

Given other type imagery exploited for equalization purposes, for the synthetic detector ν, $$d_{detector\_\nu}*f_{mapping\_\nu} = d_{array}$$

The synthetic detector ν is useful as a constraint on parameters of the $f_{mapping}$ functions. Each $f_{mapping}$ function is assumed to be a quartic of the following form:

$$f_x(x) \equiv c0_\alpha + c1_\alpha \cdot x + c2_\alpha \cdot x^2 + c3_\alpha \cdot x^3 + c4_\alpha \cdot x^4$$

In order to prevent the $f_{mapping}$ functions from converging to a flat function, thus equalizing all output signals to the same value, the sums of all coefficients c0, c2, c3 and c4 are constrained to be zero, while the sum of all coefficients c1 is constrained to be one.

The constraint is implemented through the synthetic detector ν, by not assigning ν its own free parameters c0-c4. Instead, the $f_{mapping}$ function coefficients for ν are defined as the residuals with respect to the constraints of the sums of the other detector $f_{mapping}$ function coefficients, as follows:

$$c0_v \equiv -\Sigma c0, c1_v \equiv 1-\Sigma c1, c2_v \equiv -\Sigma c2, c3_v \equiv -\Sigma c3, c4_v \equiv -\Sigma c4,$$

where the sums are across the real detectors. In this manner, if the synthetic detector v is added to the data of the other detectors, the constraints on the sums of detector $f_{mapping}$ function coefficients are met across the combination of real and synthetic detectors.

Any general trend in the real $f_{mapping}$ function coefficients is offset by an equal and opposite trend in the synthetic detector $f_{mapping}$ function coefficients, so that equations involving the synthetic detector v have low squared differences and the $f_{mapping}$ function coefficients of the overall collection of data show no overall trends. Only detector-to-detector variations are adjusted by the $f_{mapping}$ functions.

For side-slither imaging, only equations across time need be used. Each detector has 5 parameters, for a total of 5·M parameters. Pairs of spatial neighbors produce (M–C)·N equations, where C is the number of chips. Chip functions produce at least 10·(C–1)·N, if there are 2 detectors of overlap per junction. Finally, equating each detector to the synthetic detector v produces another M·N equations.

With general imagery, equations across time are used for spatial neighbors and between spatially redundant detectors, while equations across distributions are used between each detector and the synthetic detector v.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. An imaging sensor system comprising:
at least one image sensor having a plurality of detectors defining a sensor array, each detector configured to provide an output signal representative of a sensed image; and
an equalization system configured to receive respective output signals from the detectors; estimate a distribution for at least one detector based on the respective output signals; compare the distribution of the at least one detector to a given distribution to determine a mapping function for the at least one detector; and apply the respective mapping function of the at least one detector to the output signal of the at least one detector to provide an equalized signal for the at least one detector;
wherein the equalization system is configured to estimate a distribution for at least a second detector based on the respective output signals; determine a mapping function for the at least second detector; and apply the respective mapping function of the at least second detector to the output signal of the at least second detector to provide an equalized signal for the at least second detector; and
wherein the mapping function for the at least second detector is determined using the formula:

$$d_{detector} * f_{mapping} = d_{second} * f_{second}$$

wherein $d_{detector}$ is the distribution of the at least one detector, $f_{mapping}$ is the mapping function of the at least one detector, $d_{second}$ is the distribution of the at least second detector, and $f_{second}$ is the mapping function of the at least second detector.

2. A system according to claim 1, wherein the given distribution is an estimated distribution of the sensor array.

3. A system according to claim 2, wherein the mapping function for the at least one detector is determined using the formula:

$$d_{detector} * f_{mapping} = d_{array}$$

wherein $d_{detector}$ is the distribution of the at least one detector, $d_{array}$ is the distribution of the sensor array and $f_{mapping}$ is the mapping function of the at least one detector.

4. A system according to claim 3, wherein the equalization system generates a histogram of respective output signals to estimate the distribution for the at least one detector and generates a histogram of all output signals to estimate the distribution for the sensor array.

5. A system according to claim 1, wherein the equalization system generates a histogram of respective output signals to estimate the distribution for the at least one detector.

6. A system according to claim 1, wherein the equalization system is further configured to determine a synthetic detector distribution that represents an average sensor array distribution.

7. A system according to claim 6, wherein the sensor senses an image, at the same time, across the sensor array and the synthetic detector distribution is determined by an estimate of the distribution of xt[i] across the array.

8. A system according to claim 7, wherein Cauchy weighting is used to determine the estimate.

9. A system according to claim 7, wherein a median across the array is used to determine the estimate.

10. A system according to claim 7, wherein the system orients the sensor for side-slither imagery to determine the estimate.

11. A system according to claim 6, wherein the synthetic detector distribution is determined using the formula:

$$x_v s[j] \equiv \frac{1}{M} \cdot \sum_{k=j\cdot M-M+1}^{j\cdot M} x_{cum} s[k]$$

wherein M is a number consecutive samples of a total cumulative sorted ordering of all samples $X_{cum}s[k]$ and the index k ranges from 1 to M·N, and N is the number of detectors.

12. A system according to claim 6, wherein the mapping function for each detector is taken to be a quartic of the following form:

$$f_x(x) \equiv c0_\alpha + c1_\alpha \cdot x + c2_\alpha \cdot x^2 + c3_\alpha \cdot x^3 + c4_\alpha \cdot x^4.$$

13. A system according to claim 12, wherein the sums of all coefficients c0, c2, c3 and c4 are equal to zero and the sum of all coefficients c1 are equal to one.

14. A system according to claim 13, wherein the coefficients of the mapping function for the synthetic detector are as follows:

$$c0_v \equiv -\Sigma c0, c1_v \equiv 1-\Sigma c1, c2_v \equiv -\Sigma c2, c3_v \equiv -\Sigma c3, c4_v \equiv -\Sigma c4,$$

wherein $c0_v$, $c1_v$, $c2_v$, $c3_v$, $c4_v$ are the coefficients for the synthetic detector and the sums are of the coefficients for all other detectors for which a mapping function has been determined.

15. An imaging sensor system comprising:
at least one image sensor having a plurality of detectors defining a sensor array, each detector configured to provide an output signal representative of a sensed image; and an equalization system configured to receive respective output signals from the detectors; estimate a distribution for at least one detector based on the respective output signals; compare the distribution of the at least one detector to a given distribution to determine a mapping function for the at least one detector; and apply the respective mapping function of the at least one detector to the output signal of the at least one detector to provide an equalized signal for the at least one detector;

wherein the equalization system is further configured to determine a synthetic detector distribution that represents an average sensor array distribution;

the sensor senses an image, at the same time, across the sensor array and the synthetic detector distribution is determined by an estimate of the distribution of xt[i] across the array; and Cauchy weighting is used to determine the estimate.

16. An imaging sensor system comprising:

at least one image sensor having a plurality of detectors defining a sensor array, each detector configured to provide an output signal representative of a sensed image; and an equalization system configured to receive respective output signals from the detectors; estimate a distribution for at least one detector based on the respective output signals; compare the distribution of the at least one detector to a given distribution to determine a mapping function for the at least one detector; and apply the respective mapping function of the at least one detector to the output signal of the at least one detector to provide an equalized signal for the at least one detector;

wherein the equalization system is further configured to determine a synthetic detector distribution that represents an average sensor array distribution; and wherein the mapping function for each detector is taken to be a quartic of the following form:

$$f_x(x) \equiv c0_\alpha + c1_\alpha \cdot x + c2_\alpha \cdot x^2 + c3_\alpha \cdot x^3 + c4_\alpha \cdot x^4.$$

17. A system according to claim 15, wherein the sums of all coefficients c0, c2, c3 and c4 are equal to zero and the sum of all coefficients c1 are equal to one.

18. A system according to claim 17, wherein the coefficients of the mapping function for the synthetic detector are as follows:

$$c0_v = -\Sigma c0, c1_v \equiv 1 - \Sigma c1, c2_v = -\Sigma c2, c3_v = -\Sigma c3, c4_v = -\Sigma c4,$$

wherein $c0_v$, $c1_v$, $c2_v$, $c3_v$, $c4_v$ are the coefficients for the synthetic detector and the sums are of the coefficients for all other detectors for which a mapping function has been determined.

* * * * *